United States Patent
Rbayti et al.

(10) Patent No.: US 10,576,416 B2
(45) Date of Patent: Mar. 3, 2020

(54) DEVICE FOR ARRANGING IN A CONTAINER OF A SORPTION DEHYDRATOR FOR A FLUID, CONTAINER OF A SORPTION DEHYDRATOR AND SYSTEM

(71) Applicant: Donaldson Filtration Deutschland GmbH, Haan (DE)

(72) Inventors: Abdelkhalic Rbayti, Düsseldorf (DE); Jens Schaefer, Korschenbroich (DE); Wolfgang Bongartz, Ness (DE); Susanne Fulko, Wipperfurth (DE); Peter Schaaf, Langefeld (DE); Andreas Lettau, Engelstadt (DE); Peter Schwarz, Düsseldorf (DE); Roland Westphal, Hennigsdorf (DE)

(73) Assignee: Donaldson Filtration Deutschland GmbH, Haan (DE)

( * ) Notice: Subject to any disclaimer, the term of this patent is extended or adjusted under 35 U.S.C. 154(b) by 0 days.

(21) Appl. No.: 15/321,866

(22) PCT Filed: Jun. 24, 2015

(86) PCT No.: PCT/EP2015/001269
§ 371 (c)(1),
(2) Date: Dec. 23, 2016

(87) PCT Pub. No.: WO2015/197189
PCT Pub. Date: Dec. 30, 2015

(65) Prior Publication Data
US 2017/0136407 A1  May 18, 2017

(30) Foreign Application Priority Data

Jun. 26, 2014 (DE) .................. 10 2014 009 292
Sep. 23, 2014 (DE) .................. 10 2014 013 806

(51) Int. Cl.
*B01D 53/04* (2006.01)
*B01D 53/26* (2006.01)

(52) U.S. Cl.
CPC ....... *B01D 53/261* (2013.01); *B01D 53/0415* (2013.01); *B01D 53/0446* (2013.01); *B01D 2257/80* (2013.01); *B01D 2259/41* (2013.01)

(58) Field of Classification Search
CPC ............ B01D 53/0415; B01D 53/0446; B01D 53/261; B01D 2257/80; B01D 2259/41
(Continued)

(56) References Cited

U.S. PATENT DOCUMENTS

| 3,338,032 A | * | 8/1967 | Siewert | .................. F24F 3/1411 |
| | | | | 96/115 |
| 5,190,651 A | * | 3/1993 | Spencer | ................. B01D 29/111 |
| | | | | 210/305 |

(Continued)

FOREIGN PATENT DOCUMENTS

| DE | 26 46 259 A1 | 4/1978 |
| DE | 196 45 009 A1 | 5/1998 |

(Continued)

OTHER PUBLICATIONS

International Search Report dated Feb. 3, 2016 for related PCT Application No. PCT/EP2015/001269.

*Primary Examiner* — Frank M Lawrence, Jr.
(74) *Attorney, Agent, or Firm* — Howard IP Law Group

(57) ABSTRACT

A device for arrangement in a container of a sorption dryer for a fluid, wherein a cartridge for accommodating a drying agent can be inserted into the container, wherein the device has at least one projection and/or at least one recess on a front side, wherein the projection and/or the recess is arranged eccentrically on the front side.

27 Claims, 12 Drawing Sheets

(58) Field of Classification Search
USPC .... 96/108, 137, 139, 147, 149, 152; 34/472, 34/473, 80
See application file for complete search history.

(56) References Cited

U.S. PATENT DOCUMENTS

| | | | |
|---|---|---|---|
| 6,139,609 A | 10/2000 | Eimer et al. | |
| 6,616,737 B1 | 9/2003 | Evans et al. | |
| 7,118,614 B2* | 10/2006 | Welin | B01D 53/0415 96/132 |
| 9,561,464 B2* | 2/2017 | Nishihara | B01D 53/261 |
| 2005/0252026 A1* | 11/2005 | Flaugher | F25B 43/003 34/472 |
| 2006/0065123 A1* | 3/2006 | Evans | B01D 53/0415 96/147 |
| 2009/0127184 A1 | 5/2009 | Pauwels et al. | |
| 2010/0236653 A1* | 9/2010 | Hilberer | B60T 17/004 137/870 |
| 2012/0090470 A1 | 4/2012 | McKenna et al. | |
| 2012/0312171 A1* | 12/2012 | Schaebel | B01D 46/0004 96/118 |
| 2013/0087046 A1* | 4/2013 | Aumueller | B01D 53/0415 96/118 |
| 2013/0199374 A1 | 8/2013 | Schlensker et al. | |
| 2014/0260995 A1* | 9/2014 | Adams | B01D 46/0039 96/400 |

FOREIGN PATENT DOCUMENTS

| | | |
|---|---|---|
| DE | 60027470 T2 | 4/2007 |
| DE | 102008031326 A | 1/2010 |
| DE | 10 2010 036382 B3 | 10/2011 |
| GB | 1218736 A | 1/1971 |
| GB | 1591513 A | 6/1981 |
| RU | 2393002 C2 | 6/2010 |
| WO | 2007/090250 A1 | 8/2007 |
| WO | 2011/044091 A2 | 4/2011 |

* cited by examiner

DEVICE FOR ARRANGING IN A CONTAINER OF A SORPTION DEHYDRATOR FOR A FLUID, CONTAINER OF A SORPTION DEHYDRATOR AND SYSTEM

CROSS-REFERENCE TO RELATED APPLICATIONS

This application is a national phase application under 35 U.S.C. § 371 of International Patent Application No. PCT/EP2015/001269 filed Jun. 24, 2015, which claims priority to German Application No. 10 2014 009 292.5 filed Jun. 26, 2014, and German Application No. 10 2014 013 806.2 filed Sep. 23, 2014, the entire contents of all of which are incorporated herein by reference in their entireties for all purposes.

FIELD

The invention relates to a device for arrangement in a container of a sorption dryer for a fluid, wherein a cartridge for accommodating a drying agent can be inserted into the container, a container of a sorption dryer and a system containing a device and a sorption dryer.

BACKGROUND

Pressurized fluids, in particular gases, and particularly preferably compressed air, are required in all areas of industrial and artisanal production, for example as operating energy and process energy. In particular compressed air must be dry, oil-free and clean in order to avoid costly production stoppages. Compressed air is usually produced by compression of air, i.e. a compressor sucks in ambient air. The ambient air can contain pollutants, dirt particles and also moisture in the form of water vapor. The water vapor can condense in an uncontrolled manner in the compressed air and lead to operational disruptions and thus to significant costs. In order to avoid operational disruptions, a pressurized fluid is usually supplied to a device for processing, in order to also satisfy the requirements of the different areas of application, for example the clean room requirements of the food or semiconductor industries.

Devices for drying and filtration of a gas are known in a variety of designs. In one preferred embodiment, such devices are formed as sorption dryers.

Sorption dryers generally serve to remove moisture from a gas and in particular a compressed gas such as compressed air, for example. In the production of compressed air, a compressor sucks in ambient air and compresses it. During the compression process, all components of the sucked in air are concentrated in accordance with the operating overpressure with a simultaneous temperature increase. However, the moisture absorption capacity of the compressed air remains approximately constant. The subsequent cooling thus leads to the saturation of the compressed air with moisture, and each additional cooling leads to the condensation of the excess moisture. Water is formed which can cause rust and corrosion in the compressed air throughout the rest of the compressed air system. It can also lead to ice formation. Rust, corrosion and ice formation lead to high consequential costs in the maintenance stage, to compromised quality, in particular in applications which have high compressed air purity requirements, such as applications in the food industry, the pharmaceutical industry or in semiconductor technology, for example, and to the premature failure of individual components and even to a complete production shutdown. Water and moisture must therefore be removed from the compressed air system.

Known sorption dryers usually have at least two containers as sections of a pipeline of the sorption dryer, in which at least one cartridge is arranged containing a drying agent (sorbent)—often in the form of an accumulation of the granular drying agent. Adsorbent drying agents are often used, with absorbent drying agents also being able to be used. The two containers as sections of the pipeline are connected by means of conduits in parallel to one another and in each case to the inlet of the gas to be dried and the outlet of the dried gas. The flow path of the gas is controlled by means of valves. A control unit realizes the control of the valves. The valve control is designed such that a container is always flowed through by the gas to be dried. The gas is dried in said container by binding of the drying agent contained in the container to the moisture contained in the gas. In this phase this container is thus in a sorption or drying phase. During the sorption phase of the one container, the other container is (usually) flowed through in the opposite direction by a portion of the dried gas in order to dry, i.e., to regenerate, the sorbent saturated during a previous sorption phase. This container is thus in the regeneration phase. If the sorbent is dried without an external supply of thermal energy, i.e. only by means of a partial flow of the previously dried gas, this is a so-called cold regeneration. After a predetermined period of time which depends on the workload of the sorption dryer, it is necessary to redirect the valves in the supply and discharge lines such that the container which was previously in the sorption phase is regenerated and the container which was previously regenerated is now used for drying the gas.

The warm regeneration of a sorption dryer is also known from the prior art. In this process, the sorption container in the regeneration phase is regenerated by means of air which is heated by a supply of external energy. The air can be either a partial flow of the dried compressed air or ambient air, for example, can also be used. In order to heat the regeneration air in connection with the warm regeneration electrical heating devices are often used.

Furthermore, it is known to install downstream of such sorption dryers or other drying systems other cleaning stages filled with different adsorption agents or catalysts such as activated charcoal, for example, which filter out other undesirable components of the dried gas, such as oil vapor, for example. Adsorption agents and catalysts are used as means for cleaning because they are able to remove other undesirable components of the dried gas, in particular liquid, vaporous or gaseous materials, from the gas. These are to be differentiated from the agents for filtration of the gas also used in the prior art in such devices, whose task is to remove solids, in particular particles, from the gas.

The used drying agent of a sorption dryer can be replaced. For this purpose, the cartridge in which the drying agent is accommodated or contained can be exchanged.

SUMMARY

Given this background, the problem addressed by the invention was to provide a device by means of which the sorption dryer works more effectively and/or which permits improved handling during assembly and/or maintenance when replacing the cartridge and/or when producing the device and/or the cartridge, wherein in particular the sealing of the flow path is not compromised and the device can nevertheless be simply constructed.

This problem is solved by means of the embodiments disclosed below.

A device for arrangement in a container of a sorption dryer for a fluid is provided, wherein a cartridge for accommodating a drying agent can be inserted into the container.

In one first aspect, the invention works on the basic principle that at least one projection and/or one recess is arranged eccentrically on a front side of the device, so that the device can be inserted into the container in a predetermined alignment and/or orientation in order to permit a connection with another device or with a connection element provided on the sorption dryer. In this context, the term "eccentric" comprises an arrangement of the projection and/or of the recess such that the central point of the projection and/or of the recess does not coincide with the central point of the front side. The additional formation of a central projection and/or a central recess is not ruled out. In particular, an appropriate corresponding structure can be formed on a surface on the element to be connected to the device, by means of which the at least one projection and/or the at least one recess, which is formed eccentrically, can be brought into an engagement. By means of the at least one projection and/or the at least one recess, the position of the device relative to the elements adjacent in the flow path with regards to a rotation about the normal of the front side, on which the at least one projection and/or the at least one recess is formed, can be clearly defined, which makes it is possible to influence the course and the formation of the flow path. For example, a service technician or user who has to insert a cartridge into the container can refer back to the arrangement of the at least one projection and/or the arrangement of the at least one recess in order to achieve the correct orientation of the device. According to the invention, by means of the formation of a projection and/or a recess, a plug-in connection can be achieved which can be easily manipulated by a service technician or user. A screwing operation for formation of the connection can be dispensed with. The at least one projection and/or the at least one recess must simply be brought into an engagement with a corresponding structure. It is thus possible, for example, for a projection or a recess to be brought into an engagement with a corresponding recess or a corresponding projection. However, it can also be envisaged that a projection protrudes into another projection at a connection point. A plug-in connection with a projection and/or recess can be formed, in which a projection is used as a plug and a recess as a socket, and the recess and/or projection are plug-in elements. It is also possible to envisage that intermediate elements are used in order to connect, for example, a recess with a recess on another device and/or on a sorption dryer-side connection element; such an intermediate element could be a tubular cylinder, which can be inserted in one of the connections at the end. Preferably at least one projection and/or one recess can be provided on two opposite surfaces in each case. For example, several devices can be inserted into the container in a stacked manner by means of formation of a plug-in connection. The at least one projection and/or the at least one recess can be formed geometrically identical or different on the two opposite surfaces. The following embodiments of one of the surfaces also apply to the opposite surface if such an opposite surface is provided.

The device thus has a front side with a projection and/or a recess. The front side has an outwards-facing or exposed surface, which has at least one section, which is aligned with the head or base end of the container or an adjacent device. The at least one section of the surface can have a surface normal which intersects the cross-sectional area of the head or base end of the container, preferably in an angular range from 60° to 120°, particularly preferably close to 90°. The front surface is preferably formed on a frontally arranged element of the device or a front element. The device can comprise the front element or consist of the front element. The front element preferably has a cross section which is adapted in terms of size and shape to the container cross section.

In one preferred embodiment, the device has a first front side and a second front side opposite the first front side and facing away from the first front side. In particular, through-holes can be formed on both front sides of the device. In particular, it is possible to envisage that no channel enclosed by an additional wall is formed inside the device. The interior of the device can be flowed through freely. The ability to be freely flowed through also means that, between the through-holes, no physically present delimited channel is formed which delimits the through-holes at the ends. The inner surface of an outer wall of the device can be in a flow connection with a through-hole formed on the front side. The device can be free of intermediate walls on the interior. The device can preferably be formed centrally on one front side or on two front sides in a closed manner. The device can have a smooth front surface without a projection and/or recess in the central area of the front side. The front side of the device is preferably threadless.

According to the invention, a "sorption dryer" is understood to mean a device for drying a fluid, in which a filtration of the fluid can also be provided. A pressurized fluid can thus have its moisture and, if appropriate, particles, removed to a predetermined quality or extent. A sorption dryer according to the invention can have an inlet and an outlet for the fluid, wherein one or more drying agents and/or filtration means which can be flowed through by the fluid can be arranged between the inlet and the outlet. A prefilter can be provided in the sorption dryer after the inlet in the direction of flow of the fluid, in which prefilter the fluid can be removed of particles and condensate. The accumulated condensate can be discharged from the prefilter via a condensate drain.

After the prefilter, the fluid can be conveyed through a drying agent, which is arranged in one or more cartridges as granulate, which may be a molecular sieve. The cartridges are situated in a container of the sorption dryer. At least one cartridge can be arranged in the container. Several cartridges which are directly or indirectly connected with one another (via suitable connecting pieces) can also be arranged in the container. The container can be part of the pipeline of the sorption dryer. In one preferred embodiment, the interior of the container can be accessed by means of opening a frontally arranged lid and/or base. The container can be opened and the cartridges inserted or removed. In one preferred embodiment, the inner wall of the container is essentially circular in cross section, and at least partially arc-shaped in cross section. Connection elements are provided above and below the container in the lid and/or base, which connection elements can be connected with the cartridge in which the drying agent is accommodated. It is also possible to envisage that adapters and/or connection pieces are interposed or interconnected between the system-side connection elements and the cartridge. By means of the connection of one of the sorption dryer-side connection elements and the device, a gas-tight connection is obtained, which is required in order to obtain the desired dehumidification. The gas-tight connection must also be formed with each additional device which may be inserted into the container, for example in the case of stacked cartridges.

In the drying agent accommodated in the cartridge the fluid can be dried to a required dryness level (pressure dew point). An after filter can be provided after the drying agent in the flow direction, in which after filter any particles derived from the drying agent are retained. The after filter can be followed by the outlet of the device and the clean and dry fluid can reach a fluid supply network and an application. It is possible for partial flows to be formed in the device. Two flow paths can be provided, wherein a drying agent can be in a drying cycle (adsorption phase) in one flow path, and in another flow path a drying agent can itself be dried (regeneration phase). It can also be envisaged that a partial flow of already dried fluid is depressurized to atmospheric pressure by means of a diaphragm, conveyed over the drying agent for the purpose of regeneration and discharged to the environment by means of a valve in particular formed as a magnetic valve and, if appropriate, by means of a muffler.

According to the invention, the term "container" comprises a section of a pipeline of a sorption dryer, into which drying agent can be inserted for dehumidification of the fluid, for example in the form of one or more cartridges arranged consecutively. In one preferred embodiment, the container has, on the front or the end, an inlet and an outlet, by means of which the fluid is conducted into/out of the container. The inlet and/or outlet can be provided with a connection element, so that on the front side (in other words, on the base and/or head end) the container can have a connection element. The connection element can be formed on the system side. The connection element can be part of a base or lid of the container. The connection element can delimit the receiving space of the container upwards or downwards. The term "connection element" comprises the formation or the provision of at least one recess, preferably formed as a plug-in element on a surface which is directed into the container, and/or of at least one projection opposite the surface. The at least one projection and/or the at least one recess of the device can be brought into a gas-tight engagement with the recess and/or the projection on the connection element of the container.

According to the invention, the term "fluid" comprises a gas, in particular compressed air.

The term "cartridge" comprises a closed unit, in which the drying agent is accommodated. A pressure is applied between the drying agent and the cartridge which is preferably such that the drying agent is immobile in the cartridge. In addition, the drying agent is preferably introduced into the cartridge and fixed therein in such a way that it is also immobile under the effects of high gas speeds. In one preferred embodiment, the cartridge has a side outer wall, which can form a side wall in the form of a lateral surface of a cylinder. A head and base termination can be formed on the front side by means of a front element, which in each case has at least one opening for the passage of the fluid—as an inlet or outlet in the cartridge. The front element can be formed integral with the at least one projection, the at least one recess and the edge surfaces forming the openings. In one preferred embodiment, the device according to the invention is formed as a cartridge with drying agent and has two front elements and a side outer wall. The outer wall can be connected to the front elements by means of a known method.

The eccentric arrangement of at least one recess and/or projection permits various geometric formations on the front side. For example, a projection can be arranged eccentrically on the front side, with additional elements being able to be provided—centrally also—on the front side. For example, a recess can also be arranged eccentrically on the front side, with additional elements being able to be provided—centrally also—on the front side. Any number of eccentric projections can be combined with any number of recesses on the front side. The orientation of the device in the container in relation to a rotation about the longitudinal axis of the device can be more precisely defined if several recesses and/or several projection are arranged eccentrically on the front side because different geometries can result which allow the formation of a plug-in connection only according to a predetermined orientation. However a simplified geometry can also be selected which is invariant for example in relation to a rotation about an angle below which the plug-in elements are separated from one another.

According to the invention, the term "projection" comprises a macroscopic elevation on a surface. The macroscopic elevation is preferably localized. The elevation projects relative to the surface. The elevation has at least one point that lies outside of a plane spanned by the surface. The point can lie at a spacing from the surface of 5 mm to 100 mm, preferably at a spacing of 10 mm to 50 mm, particularly preferably at a spacing of 10 mm to 30 mm. A projection can, as a structural element, be brought into a mechanical engagement with a correspondingly formed recess. A form fit can be formed between the projection and a correspondingly formed recess. A projection can also be brought into a form fit with a projection. In the case of a plug-in connection between a projection and a recess, the outer edge of the projection can be adapted to the edge of the recess. In the case of a plug-in connection between two projections, an inner edge of one of the two projections can be adapted to an outer edge of the other of the two projections. According to the invention, the external shape of the projection can be in the shape of a prism or a general cylinder, with a projection preferably being formed as a cylinder, which has a cylindrical surface extending perpendicular relative to the surface. The cylinder preferably has, on the side opposite the surface, an end surface extending essentially perpendicular or inclined relative to the lateral surface. The cylinder can have any cross section whatsoever. For example, the cross section of the cylinder can be round or have corners. In one preferred embodiment, the cross section of the cylinder is elliptical or circular. A recess can be formed inside the projection so that the projection can be formed as an edge wall or bead of a recess. In particular, the projection can be formed essentially at least partially annular or hollow cylindrical.

According to the invention, the term "recess" comprises a macroscopic cavity in a surface. The macroscopic cavity is localized. The recess of the device can, as a structural element, be brought into a mechanical engagement with a correspondingly formed projection. A form fit can be achieved between the recess and a correspondingly formed projection. According to the invention, the shape of the recess can have the shape of a general inverse cylinder, with the recess being surrounded by a side wall. A recess can preferably be formed as an inverse prism or as an inverse cylinder, which has an inverse cylindrical surface (edge surface) extending essentially perpendicular relative to the surface. The side wall of the recess can have any cross section whatsoever and it can change in its depth. The side wall can surround a round recess or a recess having corners. In one preferred embodiment, the cross section of the recess is circular or elliptical. The recess can have a recess bottom. The recess can be formed as a blind hole. The recess bottom can have spacing from the front surface which ranges from 5 mm to 100 mm, preferably from 10 mm to 50 mm, particularly preferably from 10 mm to 30 mm. The recess bottom can have sections which extend essentially perpendicular or inclined relative to the cylindrical surface of the recess. The side wall of the recess can be textured or profiled. A projection can be formed inside the recess so that the recess can surround a projection. In particular, the projection can be essentially at least partially annular or cylindrical. It can also be envisaged that the recess is formed as a through hole.

In one preferred embodiment of the invention, an opening for passage of the fluid is assigned to at least one projection and/or one recess, so that an opening for passage of the fluid is formed on the front side. By means of the opening, the fluid can flow through in particular a front element, on which a projection and/or a recess is provided on the front surface. The opening is preferably formed on the projection and/or the recess at the end. The formation of an opening in the region of a projection or a recess makes it possible to provide, by means of the projection or the recess, a sealing surface for formation of a gas-tight connection of the opening to another opening of another device or of another opening of a connection element. The structural element of the plug-in connection in the form of a projection or a recess necessarily creates the possibility of a seal and an opening is preferably arranged in this region. An opening can be surrounded by an edge of a projection or a recess. An opening can, for example, be surrounded at the edge at a spacing from a projection or from a recess. The size of an opening is preferably smaller than the base area of the projection or the recess, so that an opening on the projection or the recess is also not partially formed in the lateral surface of the projection or the recess. The openings can have an edge of any shape and can preferably be formed circular. The openings can be aligned concentric to the base area of the projection or the recess. In one embodiment, the several openings can have the same size. An opening does not have to be formed on every projection and/or recess. It is possible to envisage that the number of openings corresponds to the number of projections and recesses formed on the front side; for example, it is possible to provide one, two, three, four, five, six or more openings which, in accordance with the eccentric arrangement of the recess and/or the projection, can also be arranged eccentrically.

According to the invention, the term "seal" comprises both a sealing element, which can be formed as an O-ring or as a planar sealing element, and also a sealing surface, which can be brought to bear against an O-ring or the planar seal. In the case of a circular cylindrical projection, an O-ring can be arranged in the region of the center of the length of the projection on the outer circumference of the projection. For example, the O-ring can be arranged at a spacing of 0 mm to 40 mm, and preferably of 0 mm to 10 mm from the front surface on the projection.

In one preferred embodiment, the device has a projection and/or a recess on opposite front surfaces, so that the device can be connected with both front surfaces by means of a plug-in connection on both ends using one element in each case. The device can for example be connected with other devices, which can be flowed through by the fluid in a consecutive manner.

In particular, it can be envisaged that the front sides of the device are formed essentially identical, in order to simplify the production of the device. The device then has two essentially identical front elements, each of which is arranged at the end on a side outer wall in the form of a lateral surface, which abuts the front elements at the edge. The orientation of the essentially identically formed front elements is preferably such that, on the opposite front sides of the device, an outwards protruding projection on one front side lies opposite a outwards oriented or exposed recess on the other front side.

In one preferred embodiment, at least one projection and at least one recess are arranged alternating on a line about the central point of the front side, with the term "line" comprising, according to the invention, a closed line about the central point of the surface of the front side, which can have any shape. The shape of the line can be elliptical, circular, square or polygonal. The shape of the line preferably essentially corresponds to a circle, which simplifies the geometry. Plug-in elements arranged on a circle can also be formed more easily with respect to the construction and production of the device.

In one preferred embodiment, several projection and/or recesses are arranged at the same spacing from a central point of the surface in an angle-equidistant manner, so that several rotational positions can result, in which the device can be connected with a corresponding other device and/or the connection elements formed on the lid and/or the base of the container and/or with a cartridge, in particular when the other device and/or the connection elements formed on the lid and/or the base of the container and/or the cartridge is correspondingly formed. The several projections and/or recess at the same spacing from a central point of the surface, which are arranged in an angle-equidistant manner, can in particular be one projection and two recesses. Two projections and one recess can also be envisaged. The projections and recesses can be arranged alternating. The number of recesses and projections can preferably be identical and a recess is formed adjacent to two projections. In exemplary embodiments, the number of projection and recesses is two or three and projections and recesses alternate along a circular line about the central point. A rotational identity with an angle of 180° or 120° can thus be reached, which can simplify manipulation.

In one preferred embodiment, the device can be a cartridge for accommodating a drying agent. This makes it possible to obtain a simple design such that the plug-in elements in the form of a projection and/or a recess can be formed on the cartridge itself. It is then possible to dispense with the use of adapter, connection or module elements. However, it can also be envisaged that the device is an adapter, connection or module element, so that the plug-in elements do not have to be formed on the cartridge itself and the cartridge can be connected with the device by means of another connection, for example a screw connection, and the adapter, connection or module element has the at least one projection and/or the at least one recess on a front side. This makes it possible for the connection means of the cartridge to be selected from the adapter, connection or module element irrespective of the device, which ensures for example the connection to the end-arranged connection elements of the container or the connection elements provided in the lid and/or base of the container. An adapter, connection or module element has, according to the invention, a plug-in element in the form of a projection and/or a recess on at least one front surface. At least one opening can be formed in the front surface of the adapter, connection or module element in order to form a flow path of the fluid between a connection element provided on the container and another device which can be inserted into the container by means of the adapter, connection or module element. A modular construction can be obtained by means of the adapter, connection or module element, in which different connection options can be realized. The adapter, connection or module element can be formed the same on both front surfaces or provide a different connection option on both front surfaces. For example, the adapter, connection or module element can have on one front surface an appropriate number of openings and/or plug-in elements for the formation of a plug-in connection with a sorption dryer-side connection element or another device and, on the other front surface, a screwing option, for example, can be provided for connection with a cartridge, with which a flow connection is to be established.

In a second aspect, the invention works on the basic principle that, in one end region of the device for arrangement in a container of a sorption dryer for a fluid, at least one diffusor which projects into the device is provided, which can be flowed through by the fluid. The diffusor allows the fluid to be distributed in a targeted manner and thus better reach a predetermined region of the device, which can lead to a more efficient functioning for drying of the fluid and regeneration of the sorbent. The diffusor makes it possible to obtain the diversion of the fluid flowing into the device. An improved utilization of the drying agent which is for example present in the device.

The diffusor is preferably closed at the end and has at least one side diffusor opening, so that the fluid flowing through the diffusor is diverted to the side and is at the same time distributed in a targeted manner. On entry of the fluid into the device it is thus possible for the fluid flow coming into the device to be diverted in a sideways direction and distributed in a targeted manner in order to prevent the drying agent which is for example present to the side relative to the entry opening of the device from not being flowed through resulting in dead areas for the flowing fluid. The drying agent can be used more efficiently.

In one preferred embodiment, the at least one side diffusor opening has a non-linear course in its extension in the direction of the height of the diffusor, which allows improved distribution and thus improved or more uniform flow through the drying agent.

In one preferred embodiment, at least one diffusor is arranged on a plate, which is preferably pressurized in the interior of the device. The pressurized plate can exert a pressure on the drying agent such that the drying agent is immobile in the cartridge. The pressurization of the plate can be realized by means of a compression spring provided between the plate and the front element of the cartridge. The front element can have a guide which can guide the end of the diffusor facing the front element in order to align the diffusor essentially flush relative to a passage opening. In one preferred embodiment, the guide has a shape adapted to the end of the diffusor facing the front element which, on approach of the plate with the diffusor, engages in the end facing the front element. More than one diffusor can be fixed on the plate. It can also be envisaged that the diffusors are formed integral with the plate. A guide can be assigned to each diffusor.

In one preferred embodiment, each diffusor can be flow connected to a passage opening formed as an inlet opening in the device in the flow direction or be assigned to the inlet opening. However, it can also be envisaged that an inlet opening in the device has no diffusor. A diffusor can also be provided at an outlet of the device. For example, in one preferred embodiment, diffusors can be arranged at passage openings formed as inlet openings and as outlet openings, so that there is no preferred direction on installation with regards to inlet openings and outlet openings; the handling is simplified in this respect as there is no "top" and "bottom" of the device. It can be envisaged that a diffusor is connected in the direction of flow of the fluid to an inlet- or outlet opening or—channel formed in a projection and/or a recess or is assigned thereto.

In a third aspect, the invention works on the basic principle that a device for arrangement in a container of a sorption dryer for a fluid has a ring which improves handling, by means of which the device can be placed on a corresponding surface for example during the insertion. For example, a ring can be used to allow the device to be temporarily placed during the insertion into the container on a shelf provided on the container at the head—which in its simplest form can be designed as an edge projection at the head region of the container. The shelf can be used for storage both during insertion and when removing the device from the container. For this purpose, the device comprises a ring on at least one end region, which ring has at least two sections, which extend along the circumference of the device, with the sections at least partially extending away from the outer wall of the device. In at least one portion the sections extend at an angle, preferably at an angle essentially close to 90°, away from the side outer wall. In order to provide the storage function the sections extend in a radial direction, i.e., perpendicular to the longitudinal direction of the device or perpendicular to the longitudinal direction of the container, away from the side outer wall of the device. The sections can have a profile; the profile can have any shape whatsoever. The sectional formation of the ring in several sections which are interrupted by free areas, allows the device to be laid on an edge storage surface. The storage surface is preferably formed in accordance with the division into sections of the ring, so that, by means of rotation, the ring can be aligned relative to the storage surface such that a storage surface likewise having sections is oriented relative to the ring such that the sections can be passed through corresponding free sections of the storage surface. According to the invention, a storage surface provided on the container at the end is preferably not necessarily formed complementary to the ring formed on the device, instead, the storage surface at the opening of the container of the sorption dryer can also have larger free sections than the sections of the ring.

In one preferred embodiment, the device can be flowed through by the fluid and the device is a cartridge for accommodating the drying agent or an adapter-, connection- or module element for connection to an inlet and/or outlet in the container and/or to a cartridge. This permits flexibility, so that the cartridge itself or a connecting element in the form of the adapter, connection or module elements, which can be connected to a cartridge, can be briefly placed on a storage surface during an introduction into the container or a removal from the container. The ring can, in particular, be formed on a front element of the device, in particular, the ring can be formed integral with the front-side outer wall of the device or the front element of the device.

In one preferred embodiment, the ring extends from the outer wall of the device in a radial direction, i.e., perpendicular to the longitudinal direction of the device or perpendicular to the longitudinal direction of the container, approximately 0.5 mm to 10 mm away from the side outer wall.

In a fourth aspect, the invention works on the basic principle that a different flow distribution is achieved by means of the device for arrangement in a container of a sorption dryer for a fluid. For this purpose, the device comprises a fluid divider, which has several distribution openings which have different surfaces. The fluid divider makes it possible to support the flow conditions in the sorption dryer by adaptation of the flow distribution to so-called speed "hot spots". Standardization of the flow can be achieved by means of the sorbent. The efficiency of the sorption dryer can be enhanced.

In a fifth aspect, the invention works on the basic principle that a different flow distribution can be achieved on the system side, i.e., at the sorption dryer side. For this purpose, the container has a fluid divider on the front side, which comprises several distribution openings which have different surfaces. The fluid divider makes it possible to support the flow conditions in the sorption dryer, i.e., in particular with regards to the geometry of the flow path before the entry into the container, by adaptation of the flow distribution to so-called speed "hot spots". Standardization of the flow by means of the sorbent can be achieved independently of devices to be inserted into the container. The efficiency of the sorption dryer can be enhanced independently of the devices to be inserted. The fluid divider is preferably formed on a connection element of the container for a device to be inserted into the container. The connection element can be inserted into the container at the front side. The connection element is preferably firmly attached to a base or a lid of the container. In particular, the lid with the connection element can be detachably connected to the container in order to allow a device to be inserted into the container.

In a sixth aspect, the invention works on the basic principle that a simple formation of the device for arrangement in a container of a sorption dryer for a fluid should be achieved, in which an outer wall of the device is provided, which is rolled at the end on a front element of the device. A simple manufacture of the device is possible, in which an outer wall of any shape can be formed, wherein a front element is introduced into the outer wall at the end, and the outer wall is brought to bear against the front element by means of rolling. The front element preferably has a circumferential seal, which is formed as a sealing surface and/or as a sealant arranged in a sealing slot. For example, the front element can have a circumferentially arranged slot for an O-ring. This permits a simple tight connection between the outer wall and the front element.

In one preferred embodiment, the device, in which the outer wall is rolled at the end on a front element, is formed as a cartridge for accommodating the drying agent or an adapter-, connection- or module element for connection to an inlet and/or outlet of the container and/or to the cartridge.

The above-mentioned aspects can be freely combined with one another in terms of their general design in the preferred exemplary embodiments described. Each of the aspects mentioned can be combined generally and/or in a specifically mentioned embodiment with one or more of the mentioned other aspects. A combination also includes the specific exemplary embodiments of the individual aspects mentioned below. The aspects do not contradict one another, so that no combination is ruled out, rather, every combination is desirable, as additional advantages are obtained.

In addition, the invention provides a system with a device according to one or more of the mentioned aspects and a sorption dryer for a fluid, which has a container, into which a cartridge for accommodating a drying agent can be inserted. The container can have a fluid divider.

In another aspect, the invention envisages a container of a sorption dryer for a fluid, into which a cartridge for accommodating a drying agent can be inserted, with the container having a connection element with a connection side, which is provided for cooperation with a front side of a cartridge, with the connection side having at least one projection and/or at least one recess, with the projection and/or recess being arranged eccentrically on the connection side. Such a container makes it possible to take advantage of the benefits of the device according to the invention by means of the insertion of a device according to the invention into the container.

Particularly preferably, the projection and/or the recess are formed in the region of an opening for the flowing through with fluid.

A container according to the invention designed in this manner does not however only allow cooperation with devices according to the invention. The container according to the invention can also be designed such that it has a plurality of projections and a device with at least one front side recess is inserted into the container, which is designed such that the recess accommodates at least two container projections. This permits a reduction of the number of recesses to be provided on the front side of the device, and thus of the production costs. Particularly preferably, only one recess is provided on the device, which accommodates all of the container projections.

The method according to the invention for the production of a device according to the invention, which the fluid can be flowed through and which is a cartridge, in which a drying agent is arranged, envisages that a device according to the invention, which the fluid can be flowed through and which is a cartridge, in which a first drying agent is arranged, is opened, the first drying agent is at least partially removed and a second drying agent is introduced into the cartridge. The method according to the invention thus makes it possible in a simple manner to provide a first device according to the invention, which contains a first drying agent which is not or is no longer suitable for a desired application, with a second drying agent which is suitable for the desired application and thus to produce a device according to the invention which is suitable for the desired application. The first and the second drying agent can also be of the same type and can differ, for example, in that the first drying agent is already aged (for example due to use) compared with the second drying agent.

The invention particularly relates to a device produced according to this method.

The invention also relates to the use of a device according to the invention in a system according to the invention.

The invention is explained in detail below with reference to exemplary embodiments depicted in the drawings.

DETAILED DESCRIPTION

Figure 1:
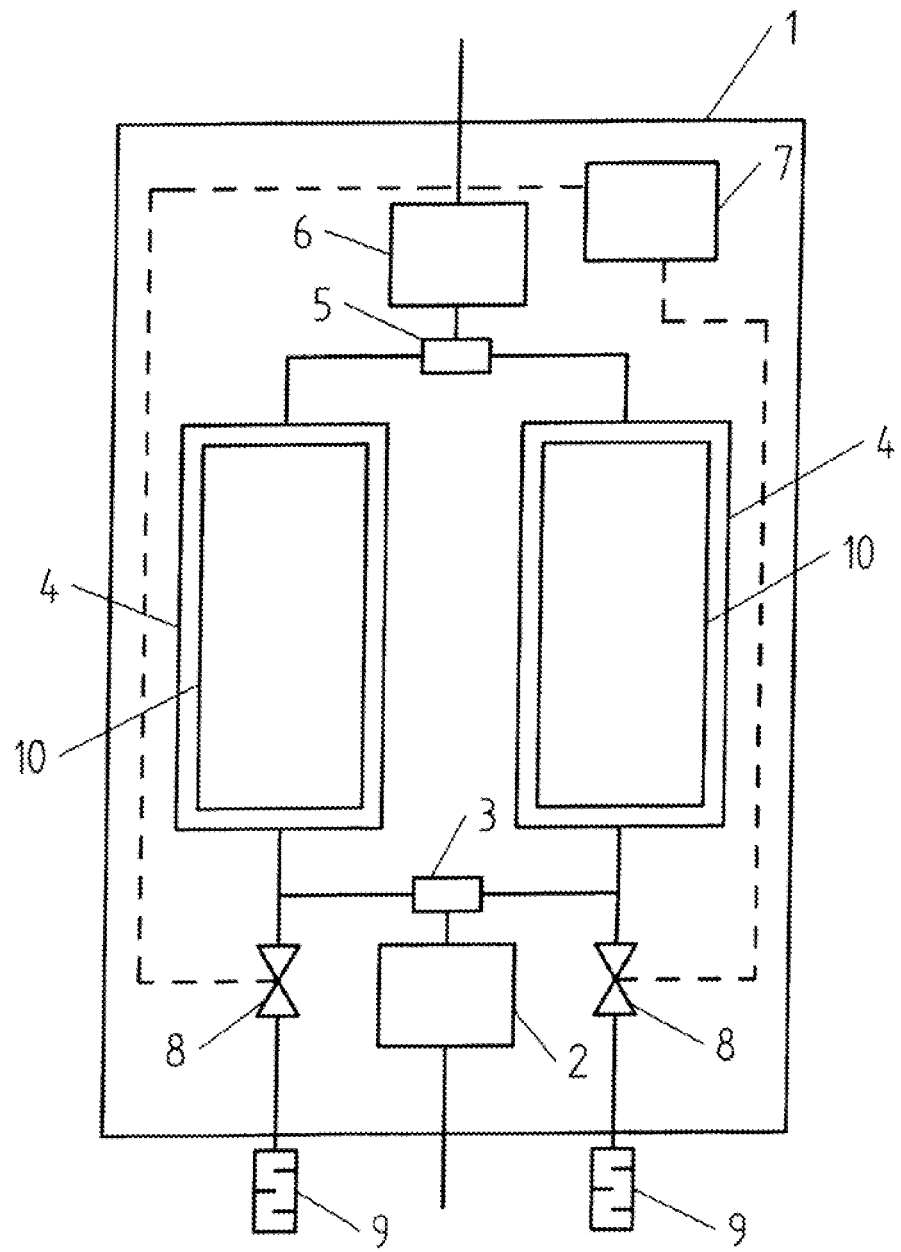
FIG. 1 shows a schematic depiction of an exemplary embodiment of a sorption dryer with two containers and two devices according to the invention.

FIG. 1 shows an exemplary embodiment of a sorption dryer for a fluid. The device has a housing 1, in which a flow path for the pressurized fluid is formed. A prefilter 2 provided for the removal of particles and condensate from the fluid is arranged after an inlet. Downstream thereof, a shuttle valve 3 arranged after the prefilter 2 is provided. Containers 4 are arranged downstream of the shuttle valve 3 in two flow paths parallel to one another in the pipelines. A device 10 formed as a cartridge for accommodating a drying agent can be inserted into the container 4. In addition, the shuttle valve 3 is followed by a magnetic valve 8, by means of which a connection with the environment can be established by means of a muffler 9.

The container 4 is followed by a shuttle valve 5. Downstream of the shuttle valve 5 is an after filter 6, in which abrasion debris from the drying agent can be retained. The after filter 6 is followed by the outlet of the sorption dryer, from which the dry and clean pressurized fluid can reach a fluid supply network and an application.

The sorption dryer has, according to the exemplary embodiment depicted in FIG. 1, a control unit 7, which has signal inputs and signal outputs. The control unit 7 controls the magnetic valves 8. In addition, it is possible to capture the signal of a sensor arranged in the direction of flow between the shuttle valve 5 and the after filter 6, which is designed to determine the moisture of the fluid. The control unit 7 can capture, observe and/or control the states of the sorption dryer.

Figure 2:
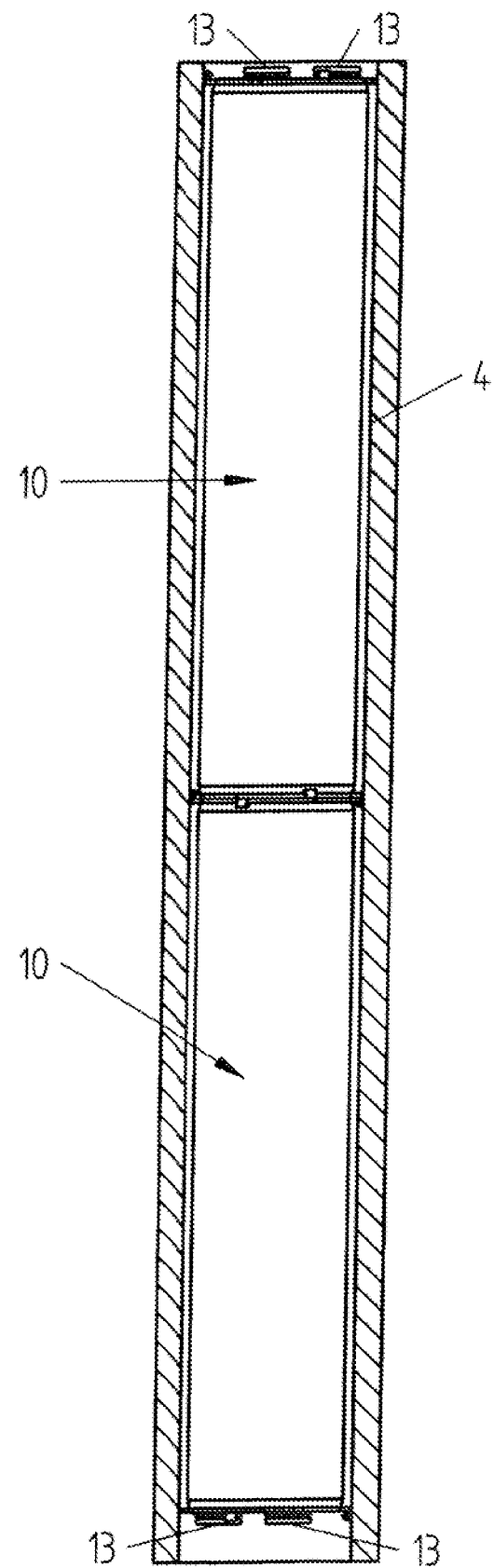
FIG. 2 shows a schematic side view of a container according to FIG. 1 with devices arranged in the container and formed as cartridges in a partially cut away depiction.

FIG. 2 depicts one of the containers 4, in which two devices 10 formed as cartridges are arranged consecutively, in which drying agent is situated. According to the invention the device 10 is formed as a device for arrangement in the container 4. Two of the devices 10 are inserted into the container 4 connected to one another. The container 4 has a cylindrical shape with a circular cross section.

The devices 10 depicted in FIG. 2 have projections and recesses on the front side of the devices 10 by means of which the devices 10 are connected. In the depiction of FIG. 2, the projections 13 can be seen on the upwards oriented front side of the top device 10 and on the downwards oriented front side of the bottom device 10.

Figure 3:
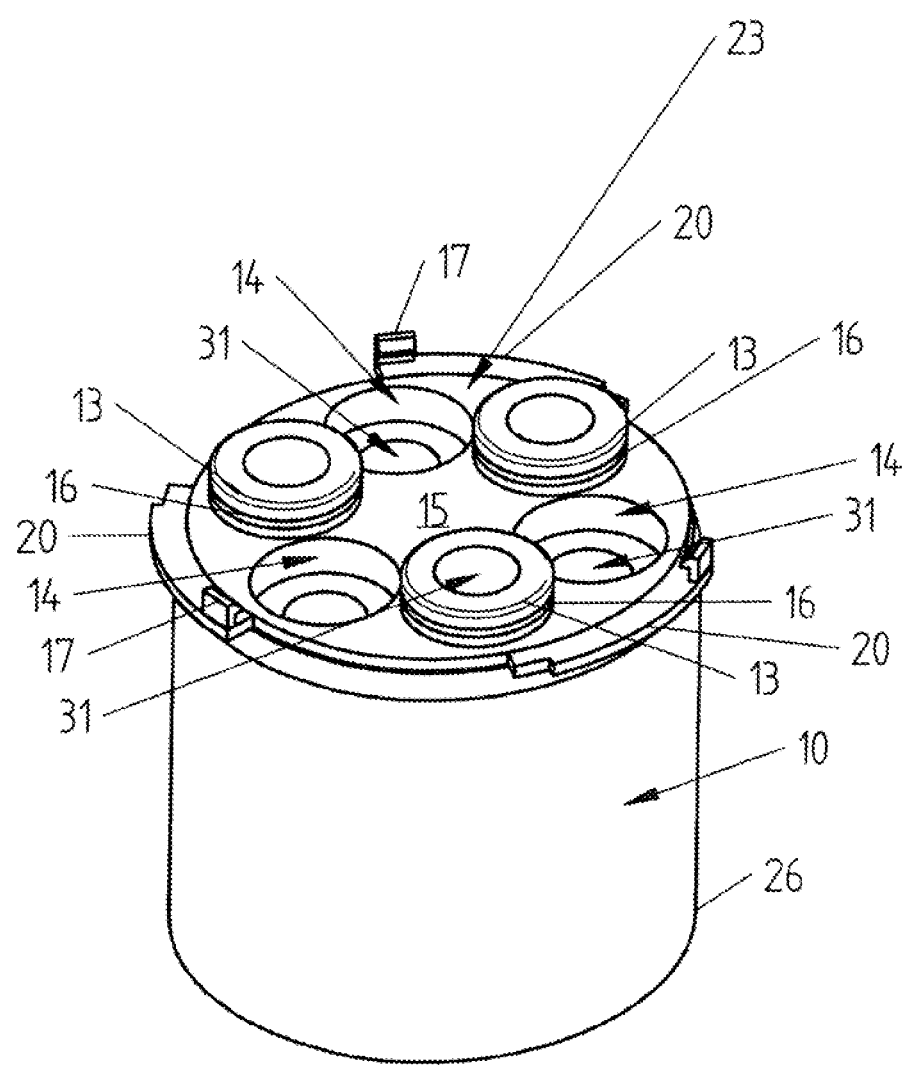
FIG. 3 shows an isometric depiction of an end region of a device formed as a cartridge, as depicted in FIG. 2.
Figure 4:
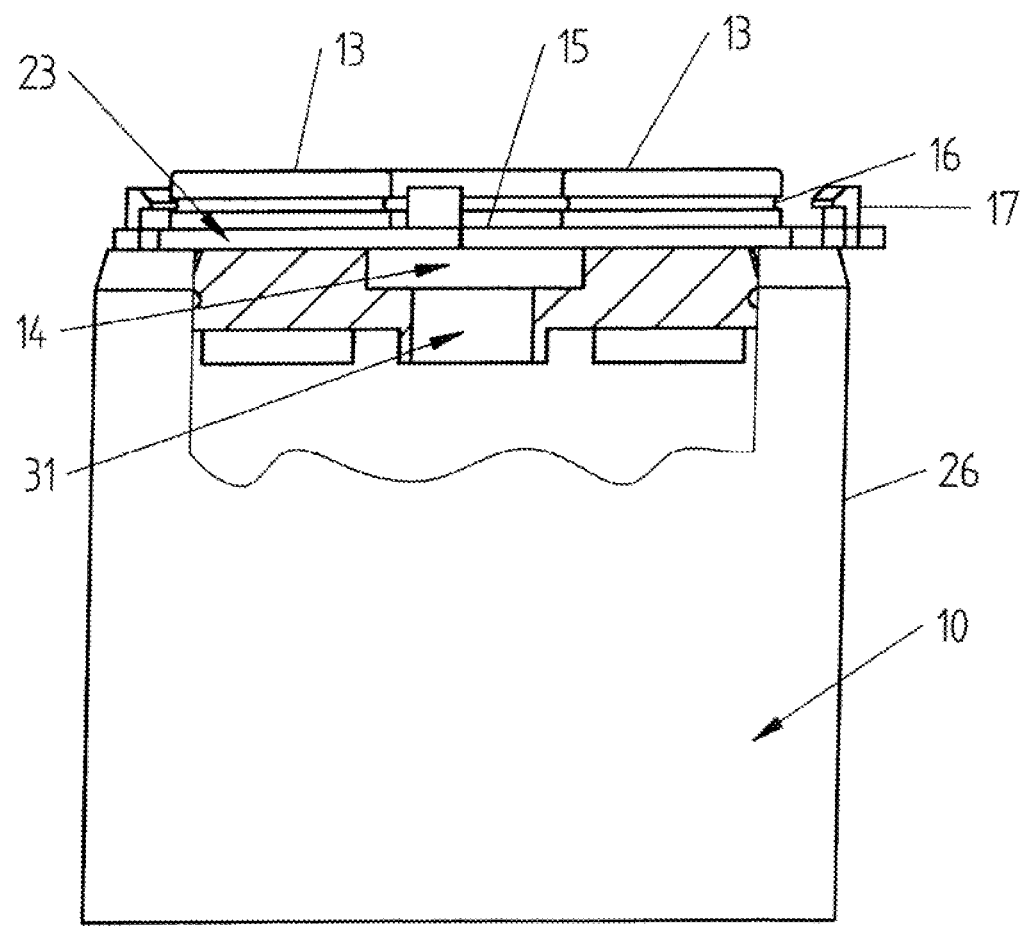
FIG. 4 shows a schematic side view of an end region of a device formed as a cartridge according to FIG. 3 in a partially cut away depiction.

FIGS. 3 and 4 depict an end region of the device 10. The device 10 has in the depicted end region a front element 23 connected to a side outer wall 26 of the device 10. The front element 23 comprises a front surface 15, on which three projections 13 and three recesses 14 are formed. The projections 13 are formed annular. The recesses 14 are formed as circular cavities in the surface 15 of the front element 23. Circular openings 31 which pass through the front element 23 are formed on the projections 13 and the recesses 14. An opening 31 is aligned concentric to a projection 13 or a recess 14. By means of the openings 31, the projections 13 and the recesses 14 constitute channels for the passage of the front element 23 into the device 10.

The projections 13 of a device 10 can be inserted into the recesses 14 of another device 10. For a tight connection between the projections 13 or the recesses 14, the projections 13 have a seal in the form of an O-ring, which is fixed to a groove-shaped cavity 16 around the projection 13 on its edge.

The projections 13 and the recesses 14 are formed in an alternating arrangement on the front surface 15 of the device 10 in an angle-equidistant manner at the same spacing from the central point of the front surface 15.

Detents 17 are formed on the device 10 at the front side, by means of which the plug-in connection can be detachably fixed when a detent 17 comes into engagement with a corresponding catch.

In the exemplary embodiment depicted in FIGS. 3 and 4, each projection 13 and each recess 14 is assigned a base opening 31, by means of which the front element 23 can be flowed through by the fluid.

Figure 5:
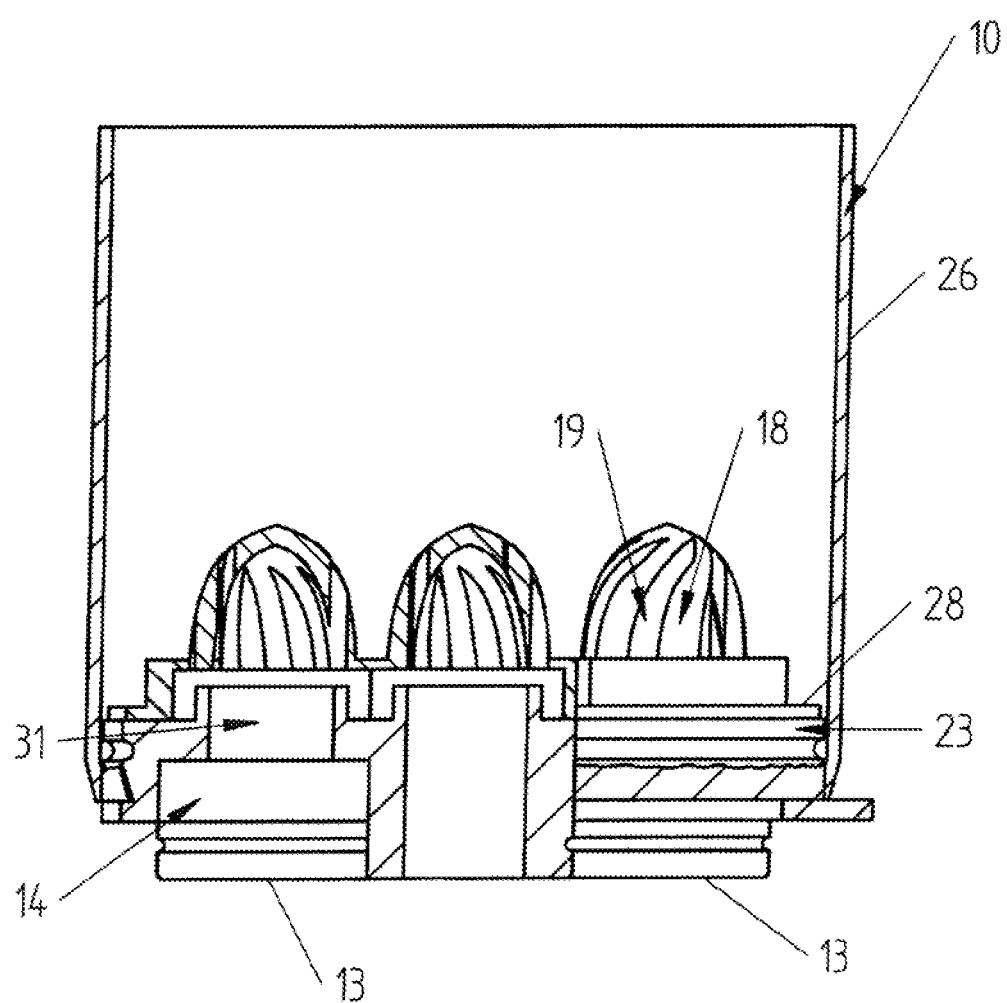
FIG. 5 shows a schematic side view of an end region of an embodiment of the device formed as a cartridge depicted in FIG. 3 in a partially cut away depiction with diffusors protruding into the interior.
Figure 6:
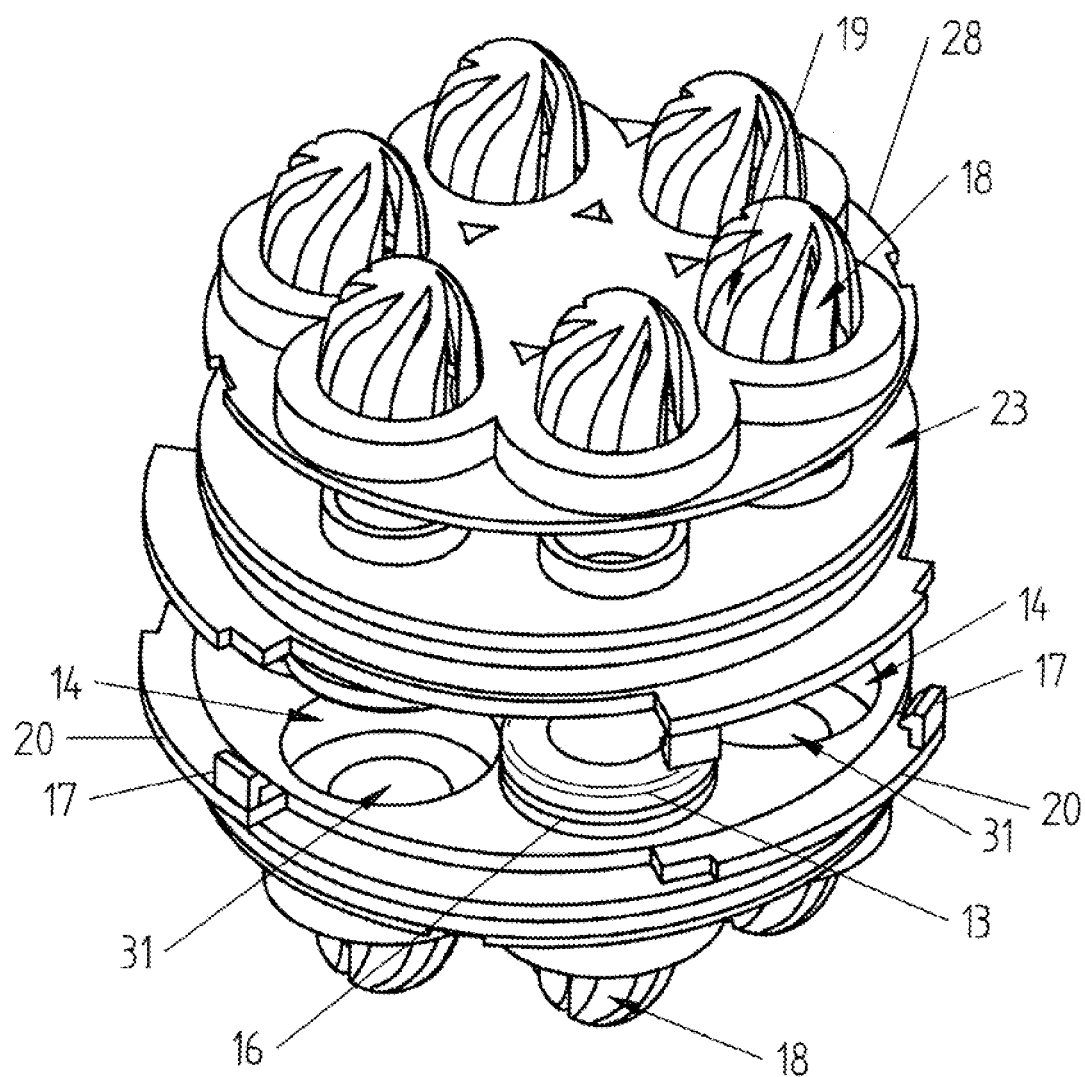
FIG. 6 shows a schematic isometric detailed view in the region of the connection between two devices according to FIG. 5 without a side outer wall of the devices.
Figure 7:
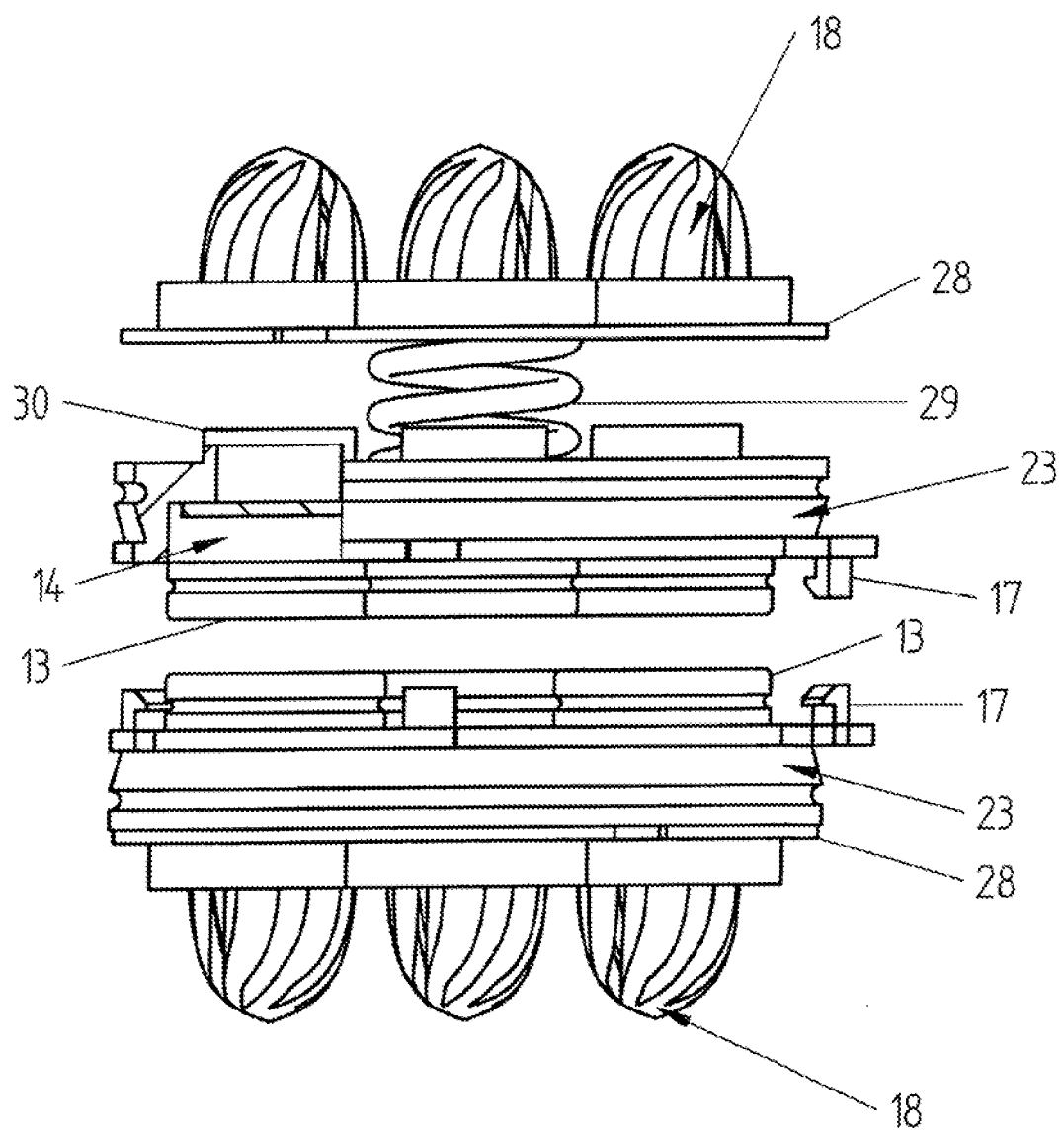
FIG. 7 shows a schematic side view of an embodiment in the region of the connection between two of the devices according to FIG. 5 without a side outer wall of the devices.

FIGS. 5 to 7 depict how channels with passage openings can be formed in the projections 13 and recesses 14, to which a diffusor 18 extending into the interior of the device 10 can connect. The diffusor 18 is arranged centrally relative to the opening 31.

The fluid can enter into the device 10 through the openings 31 formed in the recesses 14 and the projections 13 and is swirled by means of the diffusor 18. The swirling takes place mainly at the side, so that a fluid entering the device 10 is diverted to the sides. The diffusor 18 is closed at the end for this purpose and has at least one side diffusor opening 19, which does not extend linearly in its extension in the direction of the height of the diffusor 18. The side diffusor opening 19 has at least one section which does not extend linearly in the longitudinal direction of the diffusor 18.

The diffusors 18 are arranged on a plate 28. In the exemplary embodiment depicted in FIG. 7, the plate 28 is spring loaded relative to the front element 23 by means of a compression spring 29 away from the front element 23 in the direction of the interior of the device 10. FIG. 7 depicts a different spacing of the plate 28 with the diffusors 18 from the front element 23 for the end region of the top device 10 and the end region of the bottom device 10 of FIG. 2. In the uppermost of the two devices 10 it can be seen that guides 30 are provided on the front element 23, which extend in the direction of the interior of the device 10 and by means of which the end of the diffusor 18 facing the front element 23 can be brought into an engagement if the plate 28 is pressed against the front element 23. In this way, the diffusors 18 can be aligned with the inlet openings formed in the projections 13 and recesses 14.

Figure 8:
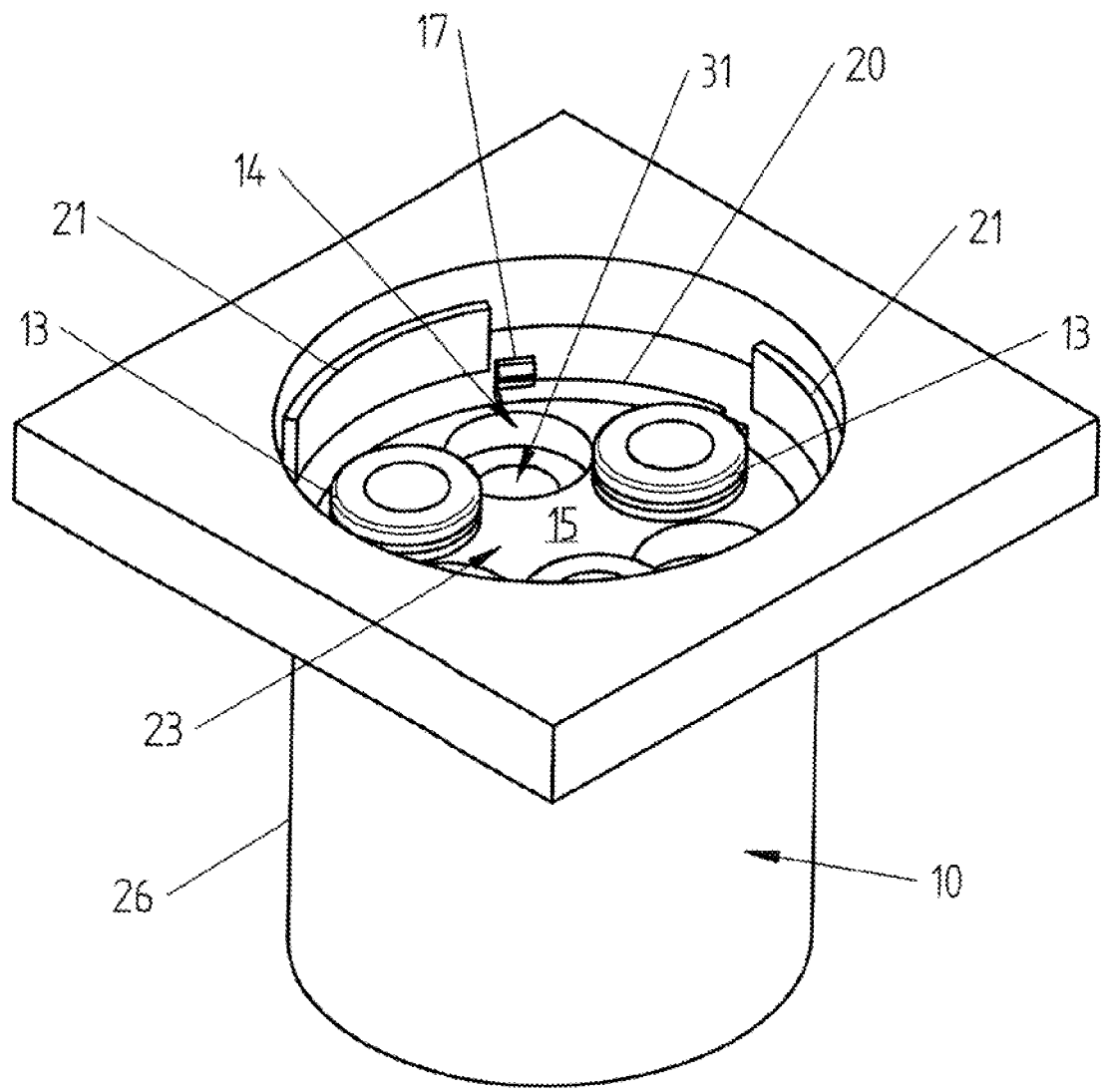
FIG. 8 shows a schematic isometric detailed view of an embodiment of a top edge region of the container according to FIG. 1 and of an end region of a device formed as a cartridge according to FIG. 3.

The reference numeral 20 in FIG. 8 identifies in each case a section of a ring on the device 10 formed as a cartridge. The ring with the sections 20 is formed circumferentially on both ends of the device 10. The ring is formed integral with the front element 23. The sections 20 are formed along a portion of the circumference of the device essentially on a plane. The sections 20 extend at least partially away from the outer wall 26 of the device 10. The ring forms the largest circumference of the device 10. The sections 20 of the ring can be set on a head-side edge of the container 4. In the exemplary embodiment depicted in FIG. 8, an edge adapted to the ring is formed on the container 4 at the head side. The division of the sections 20 of the ring corresponds to a division of a storage surface 21 formed in the edge region of the container 4. The device 10 can be set on the storage surface 21 with the sections 20 of the ring. By means of rotation of the device 10, the ring or the sections 20 can be turned such that the sections 20 of the ring align with free gaps in the storage surface 21 and the device 10 is introduced into the container 4.

Figure 9:
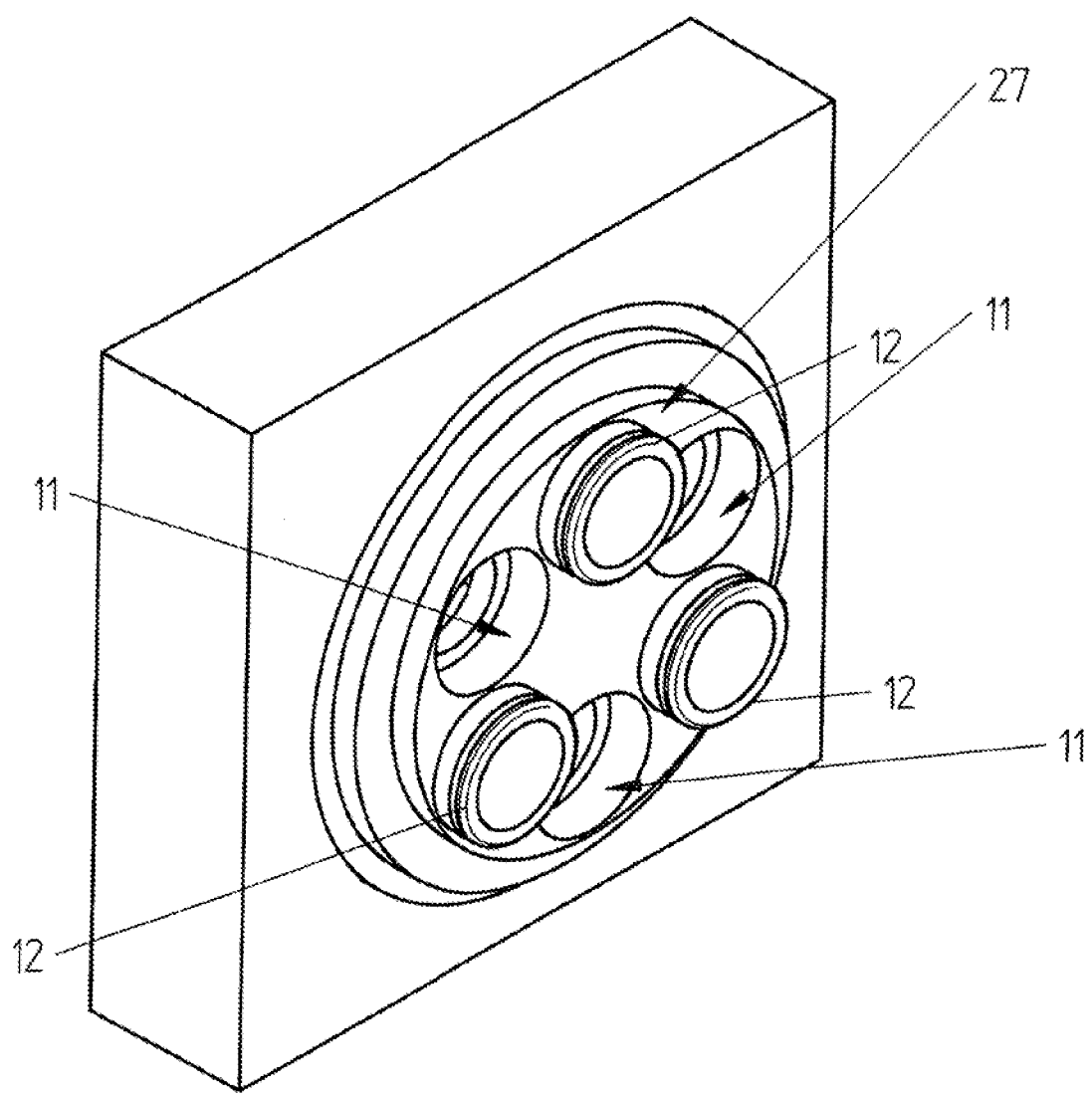
FIG. 9 shows a schematic isometric detailed view of an embodiment of a connection element of the container according to FIG. 1 which is arranged at the head or base.

FIG. 9 shows a connection element 27 which can be arranged on the container 4 on the front side. The connection element 27 can be formed in a lid or a base of the container 4 or be connected thereto. If the connection element 27 is provided as part of the lid of the container 4, the connection element 27 together with the lid is removable for the removal or insertion of the device 10. Recesses 11 and projections 12, which are formed corresponding to the projections 13 and recesses 14 of the device 10 and which have passage openings for the fluid, are formed on the connection element 27.

Figure 10:
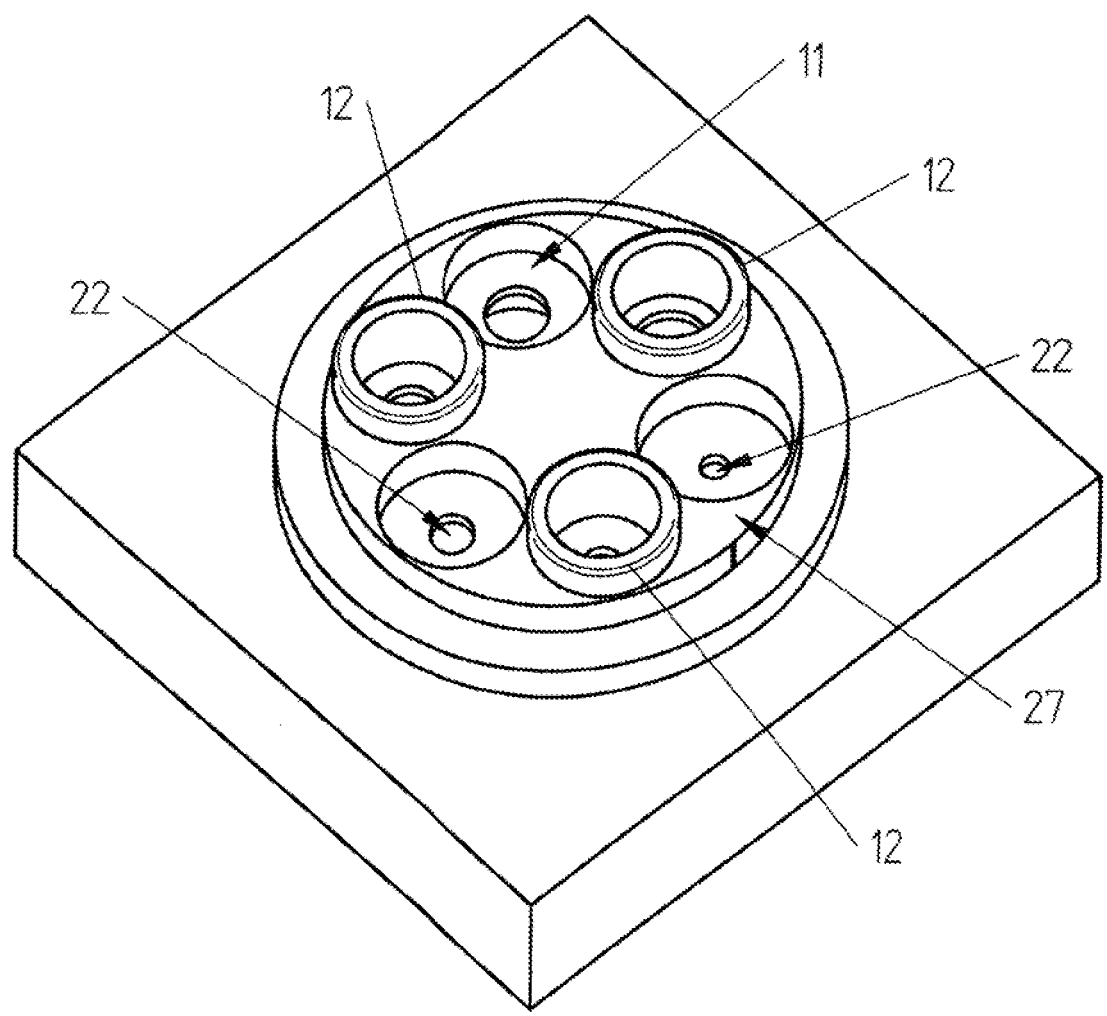
FIG. 10 shows a schematic isometric partial view of a connection element of the sorption dryer formed in the base region of the container according to FIG. 1.

FIG. 10 depicts how, at the end-side end in the head or base region of the container 4, the connection element 27 has a channel geometry which corresponds to a fluid divider, which distributes the flowing fluid on a quantity basis. In the connection element 27 depicted in FIG. 10, distribution openings 22 are formed on the recesses 11 and projections 12, which distribution openings are formed concentric to the projections 12 and recesses 11. The distribution openings 22 have a different cross-sectional area. The distribution openings 22 are preferably circular with different radii. The size of the distribution openings 22 can be adapted to the flow conditions in the sorption dryer. In particular, the size of the distribution openings 22 can be selected in a predetermined manner in the sorption dryer on the basis of a determined speed distribution of the fluid, brought about by the flow profile of the fluid.

Figure 11:
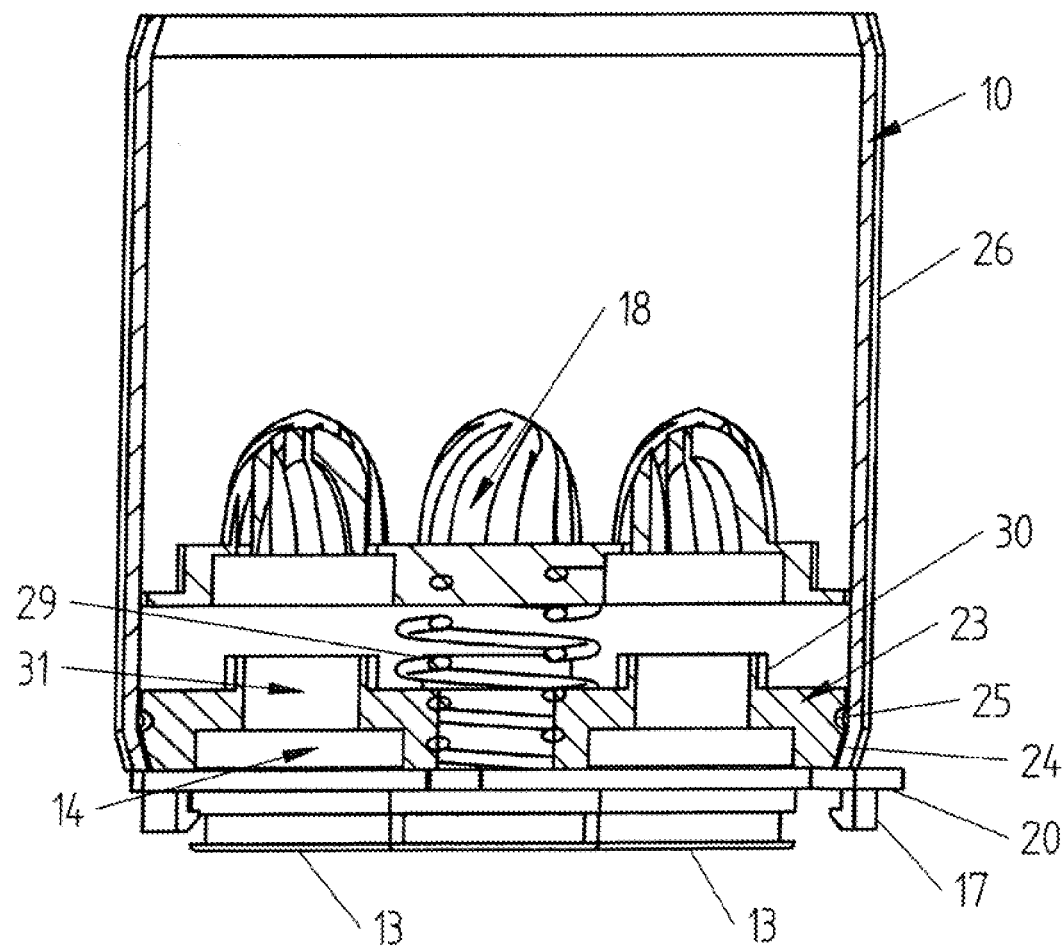
FIG. 11 shows a schematic partial view from the side of an end region of a device formed as a cartridge according to FIG. 3 in a partially cut away depiction.

FIG. 11 is a schematic depiction of an end region of the device 10 with the side outer wall 26 of the device 10. The outer wall 26 is connected to the front element 23 of the device 10, on which the projections 13 and recesses 14 are formed and on which the ring is formed. The front element 23 has a circumferential bevel 24, against which the side outer wall 26 of the device 10 is rolled. For the purpose of a tight connection, a slot 25 for an O-ring is formed on the front element 23, by means of which O-ring the side outer wall 26 of the device 10 establishes a tight connection.

Figure 12:
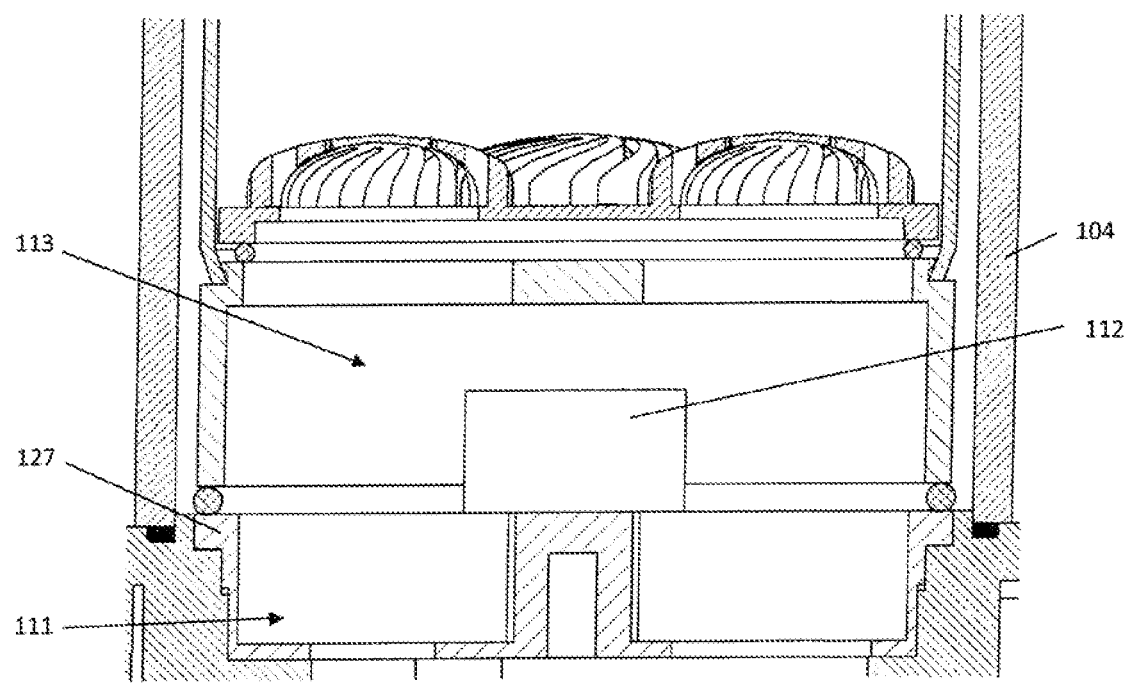
FIG. 12 shows a schematic, cut away view of another embodiment of the invention, in which a container of a sorption dryer for a fluid with a plurality of recesses and projections on a connection surface cooperates with a device according to the invention, which has only one recess which accommodates all of the container projections.

FIG. 12 shows that a container 104 of a sorption dryer for a fluid with a connection element 127 with a plurality of recesses 111 and projections 112 on a connection surface can cooperate with an embodiment of the device according to the invention, which has only one recess 113, which accommodates all of the container projections 112. This allows a reduction of the number of recesses on the device and thus a reduction in the production costs of the device.

The invention claimed is:

1. A cartridge for arrangement in a container of a sorption dryer for a fluid,
    wherein the cartridge is configured for accommodating a drying agent in an interior thereof and for insertion into the container,
    the cartridge comprising at least a first element and a second element on a first front side of the cartridge, the first element comprising one of a projection and a recess and the second element comprising one of a projection and a recess,
    each of the first element and the second element being arranged eccentrically on the first front side of the cartridge;
    wherein the cartridge is configured to define one or more flow paths from one or more openings through the first front side to one or more openings through an opposite front side of the cartridge, each of the one or more flow paths between any of the one or more openings in the first front side and any of the one or more openings in the opposite front side being through the interior for accommodating the drying agent.

2. The cartridge according to claim 1, wherein the at least first element and the second element are formed in a region of an opening of the cartridge for the flowing through with fluid.

3. The cartridge according to claim 2, further comprising a plurality of openings formed on the first front side, each of which is arranged in a region of a corresponding one of the at least first element and the second element.

4. The cartridge according to claim 1, further comprising a sealing element formed on at least one of the first element and the second element.

5. The cartridge according to claim 1, wherein the at least first element and the second element are formed on opposite portions of the first front side of the cartridge and the second element comprises the other one of a projection and a recess from the first element, and wherein the recess on one front side lies opposite the projection on the other front side.

6. The cartridge according to claim 1, wherein the at least first element and the second element are configured as cylindrically shaped.

7. The cartridge according to claim 1, wherein the at least first element and the second element are arranged alternating on a line about a central point of the first front side.

8. The cartridge according to claim 1, wherein the at least first element and the second element are arranged at the same spacing from a central point of the first front side in an angle-equidistant manner.

9. The cartridge according to claim 1, further comprising at least one diffusor positioned in an end region of the cartridge, and protruding into an interior of the cartridge.

10. The cartridge according to claim 9, wherein the at least one diffusor is closed at the end and has at least one side diffusor opening.

11. The cartridge according to claim 10, wherein the at least one side diffusor opening does not extend linearly in its extension in the direction of the height of the diffusor.

12. The cartridge according to claim 9, wherein the at least one diffusor is arranged on a plate which is pressurized in the direction of the interior of the cartridge.

13. The cartridge according to claim 1, further comprising a ring having at least two sections and extending along the circumference on at least one end region, wherein the at least two sections extend away at least partially in a radial direction from a side outer wall of the cartridge.

14. The cartridge according to claim 13, wherein the ring extends away from the outer wall of the device by at least 0.5 millimeters (mm) and at most 10 mm.

15. The cartridge according to claim 1, further comprising a fluid divider having a plurality of distribution openings of different sizes.

16. The cartridge according to claim 1, wherein the cartridge has an outer wall which is rolled at the end on a front element.

17. The cartridge according to claim 16, wherein the front element has a bevel and a seal at its circumference.

18. The cartridge according to claim 1, wherein the cartridge further comprises the drying agent contained in each of the one or more flow paths between any of the one or more openings in the first front side and any of the one or more openings in the opposite front side.

19. The cartridge according to claim 1, wherein the cartridge further comprises a filtration agent contained in each of the one or more flow paths between any of the one or more openings in the first front side and any of the one or more openings in the opposite front side.

20. A cartridge for arrangement in a container of a sorption dryer for a fluid,
wherein the cartridge is configured for accommodating a drying agent in an interior thereof and for insertion into the container,
the cartridge comprising at least a first element and a second element arranged on a first front side of the cartridge, the first element comprising one of a projection and a recess, the first element being arranged eccentrically on the first front side, the second element being arranged eccentrically on the first front side and comprising the other of a projection and a recess,
wherein the cartridge is configured to define one or more flow paths from one or more openings through the first front side to one or more openings through an opposite front side of the cartridge, each of the one or more flow paths between any of the one or more openings in the first front side and any of the one or more openings in the opposite front side being through the interior for accommodating the drying agent; and
wherein at least one of the first element and the second element comprises a sealing element.

21. The cartridge according to claim 20, wherein the sealing element comprises a sealing surface of a recess configured to cooperate with a sealing element of a projection placed into the recess; and
wherein the at least first element and the second element have defined therethrough openings for the flowing through with the fluid.

22. An adapter for arrangement in a container of a sorption dryer for a fluid,
wherein the adapter is configured to receive a cartridge that is configured for accommodating a drying agent in an interior thereof and for insertion into the container,
the adapter comprising at least a first element and a second element, the first element and the second element both arranged eccentrically on a front side of the adapter, the first element comprising one of a projection and a recess, and the second element comprising one of a projection and a recess,
wherein the cartridge is configured to define one or more flow paths from an opening through the first front side to an opening through an opposite front side of the cartridge, each of the one or more flow paths between any opening in the first front side and any opening in the opposite front side being through the interior for accommodating the drying agent.

23. The adapter according to claim 22, wherein a plurality of projections are provided on the container and the first element comprises a recess on the adapter, wherein the recess of the adapter accommodates at least two projections of the container.

24. The adapter according to claim 22, wherein the second element comprises the other one of a projection and a recess from the first element.

25. A cartridge for arrangement in a container of a sorption dryer for a fluid, comprising:
at least first and second elements on a front side of the cartridge, the first and second elements comprising projections arranged eccentrically on the front side of the cartridge;
wherein the cartridge is configured for accommodating a drying agent and for insertion into a container.

26. The cartridge of claim 25, further comprising a plurality of openings formed on the front side, each of which is arranged in a region of a corresponding one of the first element and the second element.

27. The cartridge of claim 25, further comprising a third element on the front side of the cartridge, the third element being a recess.

* * * * *